United States Patent [19]

Morris

[11] Patent Number: 5,552,014

[45] Date of Patent: * Sep. 3, 1996

[54] ROOFING TORCH

[76] Inventor: Paul L. Morris, 8815 W. 104th St., Overland Park, Kans. 66212

[ * ] Notice: The term of this patent shall not extend beyond the expiration date of Pat. No. 5,211,158.

[21] Appl. No.: 189,591

[22] Filed: Jan. 31, 1994

Related U.S. Application Data

[63] Continuation-in-part of Ser. No. 62,191, May 17, 1993, Pat. No. 5,353,782, which is a continuation-in-part of Ser. No. 880,235, May 8, 1992, Pat. No. 5,211,158.

[51] Int. Cl.⁶ ..................................................... B32B 31/00
[52] U.S. Cl. .......................... 156/577; 156/497; 156/499; 156/579; 156/322
[58] Field of Search .................................. 156/574, 577, 156/579, 497, 322, 499, 94; 126/401, 402, 403, 404, 271.2 R, 271.2 C, 271.2 A

[56] References Cited

U.S. PATENT DOCUMENTS

| 776,950 | 12/1904 | Simpson | 156/577 X |
|---|---|---|---|
| 907,731 | 12/1908 | Buckborough | 156/577 X |
| 1,773,153 | 8/1930 | Remnsnider | 242/578 |
| 4,460,433 | 7/1984 | Boyd | 156/574 |
| 4,725,328 | 2/1988 | Arnold | 156/497 X |
| 4,761,201 | 8/1988 | Nichols, Jr. | 156/497 |
| 4,918,844 | 4/1990 | Marsh | 126/271.2 R X |
| 5,211,158 | 5/1993 | Morris | 156/497 X |
| 5,353,782 | 10/1994 | Morris | 156/497 X |
| 5,439,540 | 8/1995 | Lippman et al. | 156/579 X |

FOREIGN PATENT DOCUMENTS

89/12724   12/1989   WIPO ....................................... 156/577

*Primary Examiner*—James Engel
*Attorney, Agent, or Firm*—Hovey, Williams, Timmons & Collins

[57] ABSTRACT

A torch assembly for use in fabricating and repairing roof joints includes an elongated handle presenting a forward upper end and a lower rearward end, and a torch supported adjacent the lower end for directing a flame away from the handle. A roll of bituminous material is supported on the apparatus so that the material may be dispensed from the roll in a rearward direction as the apparatus is pulled forward by the handle. An elongated shoe is supported on the handle and includes upper and lower wall sections which are connected together at the rear end of the shoe, and at least one side wall section which extends between the upper and lower wall sections and defines a flame-receiving cavity for substantially surrounding the flame directed by the torch. The shoe diverts the flame in the flame-receiving cavity upward and rearward toward the bituminous material being dispensed from the support means so that the bituminous material is heated as it is applied along the roof joint.

10 Claims, 10 Drawing Sheets

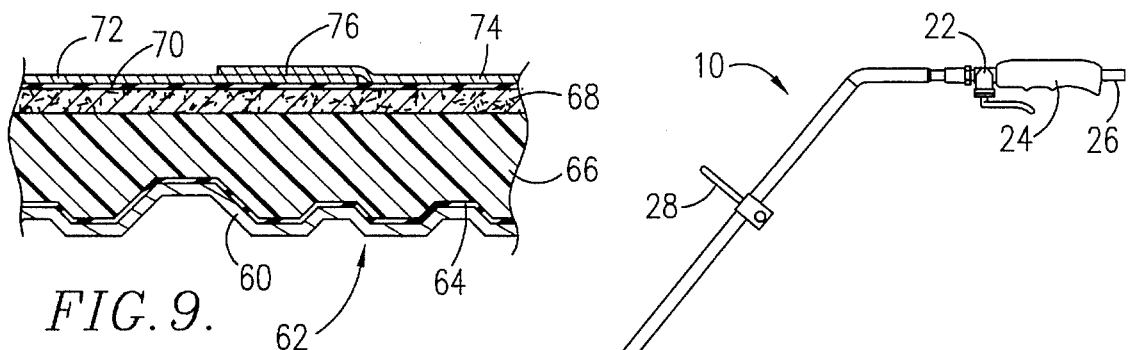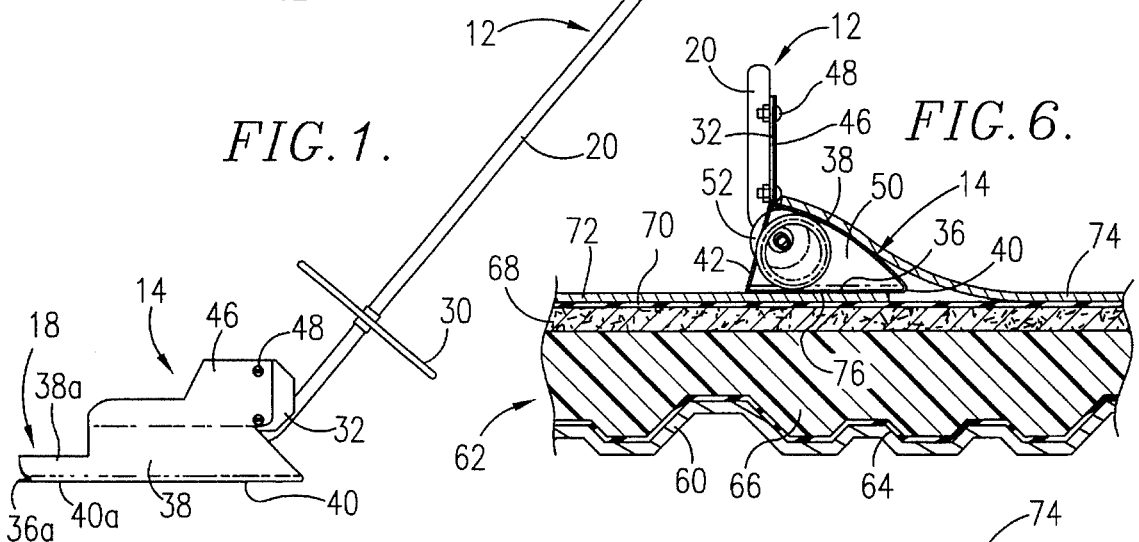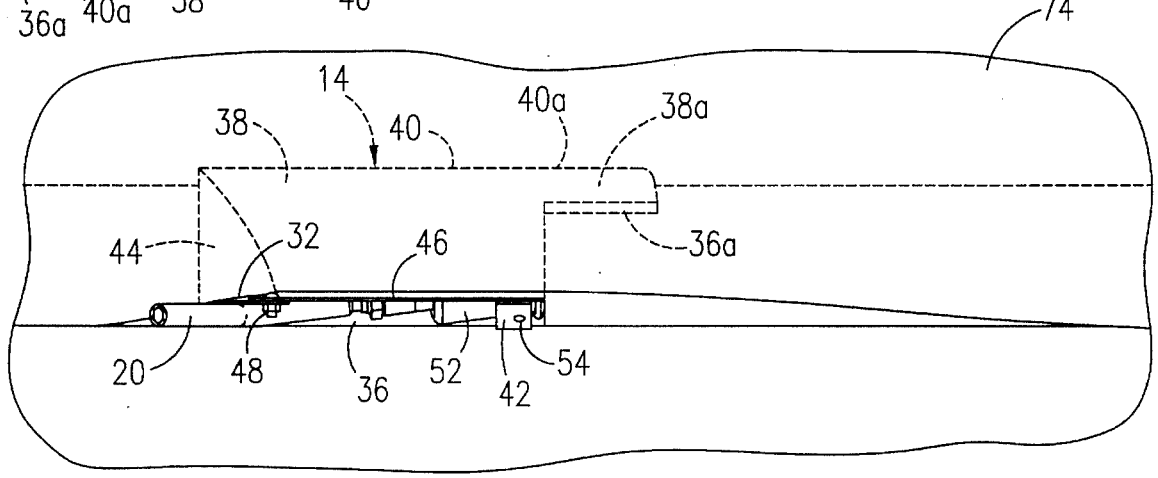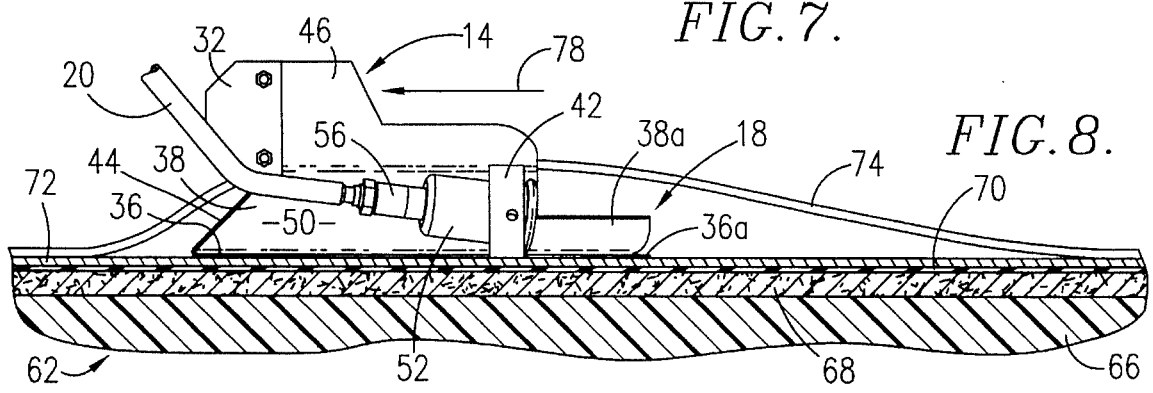

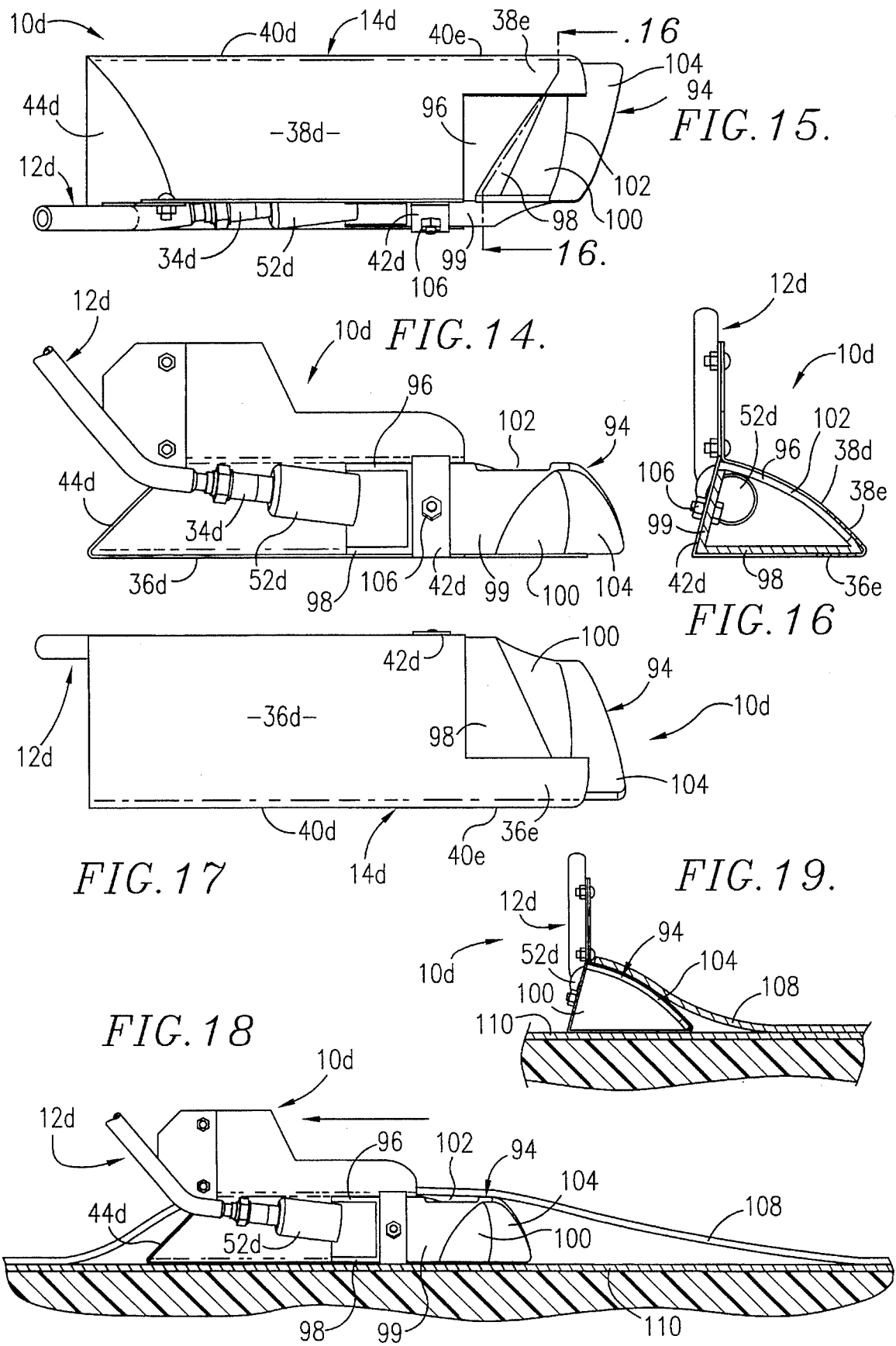

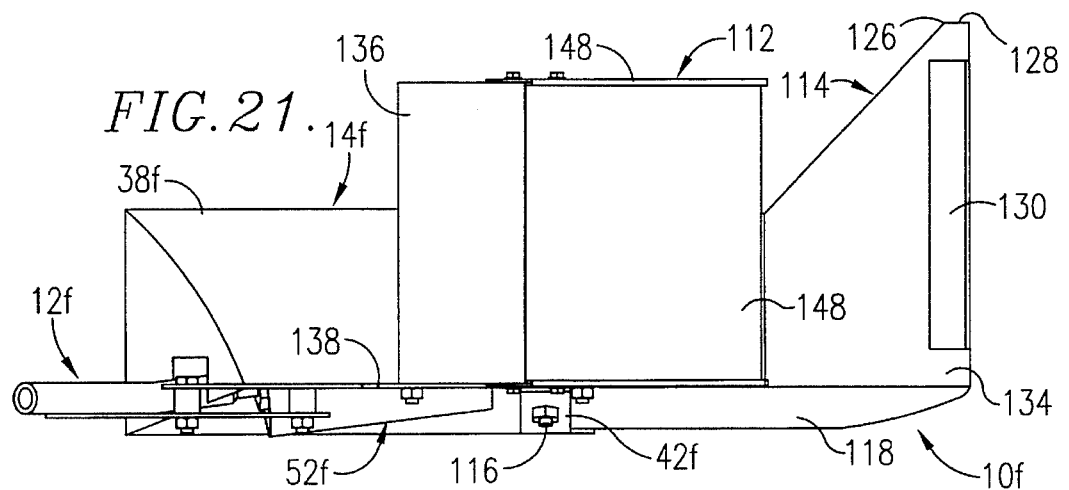
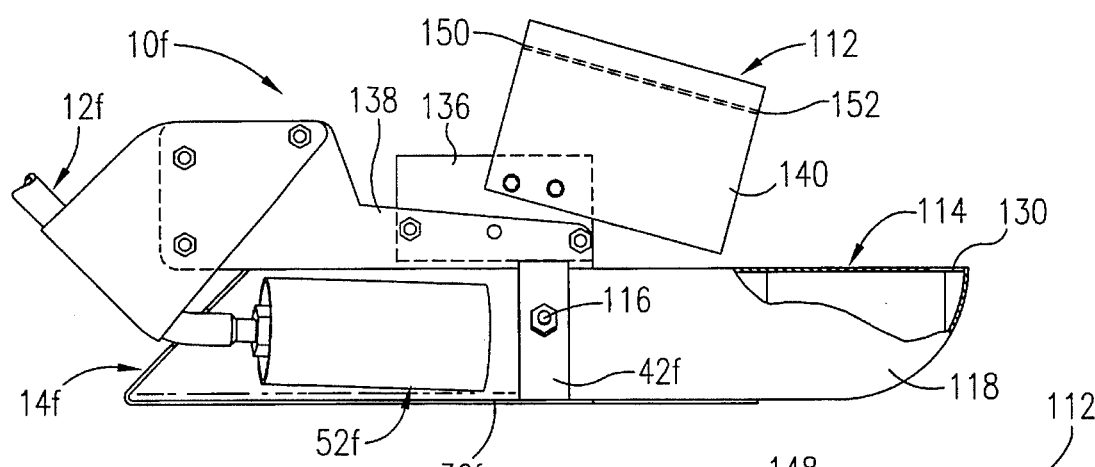
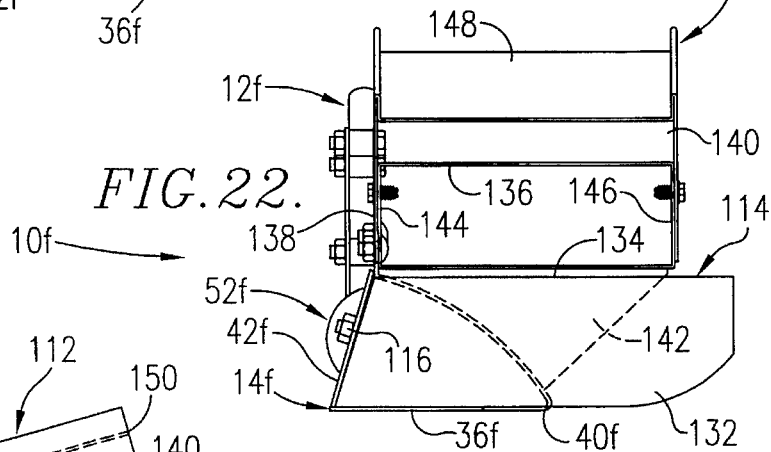
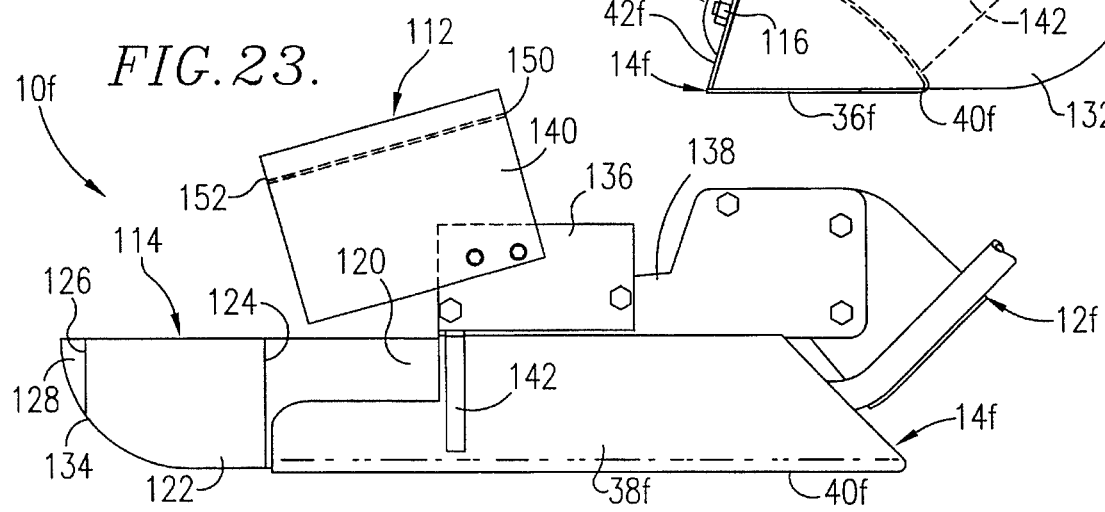

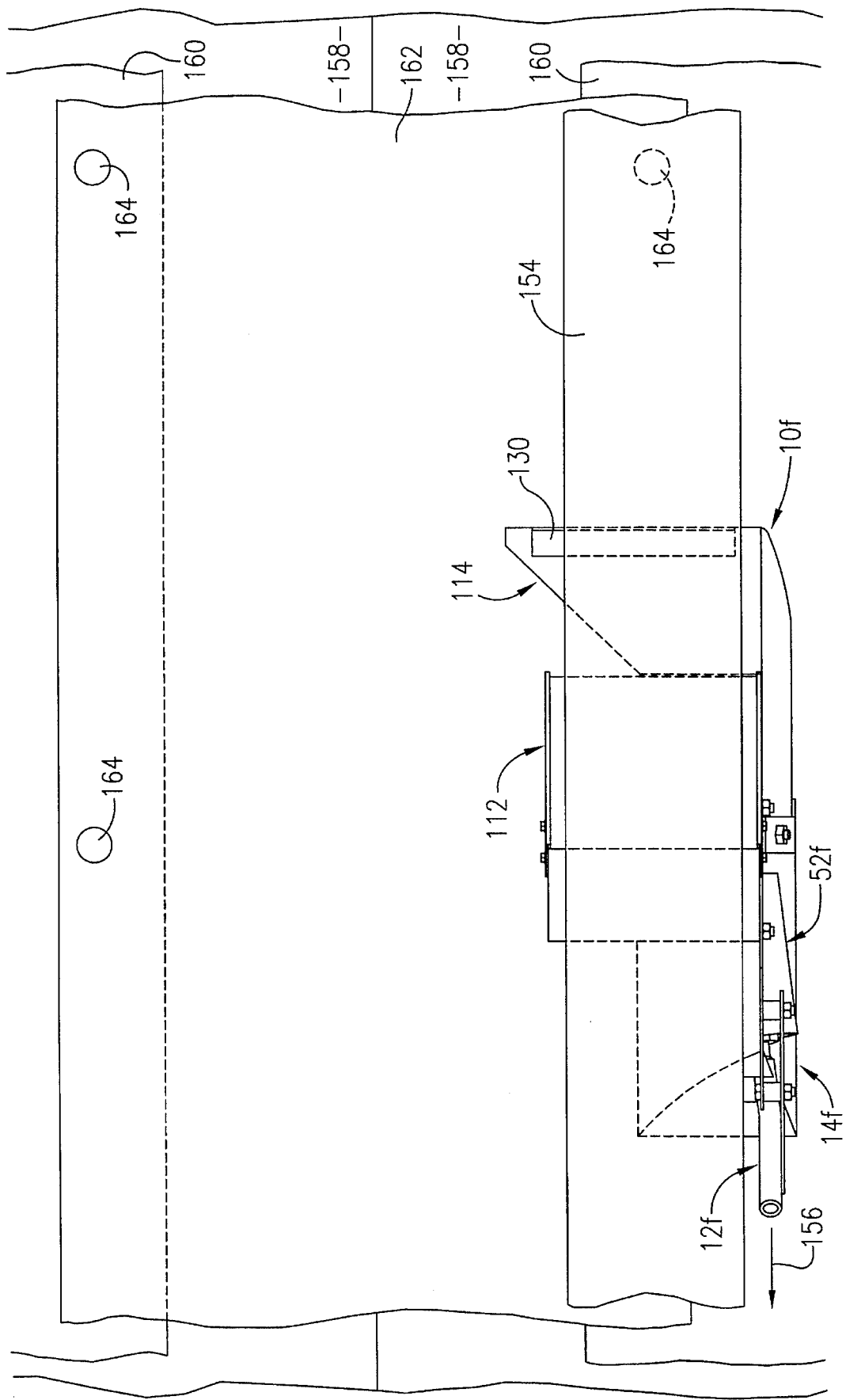

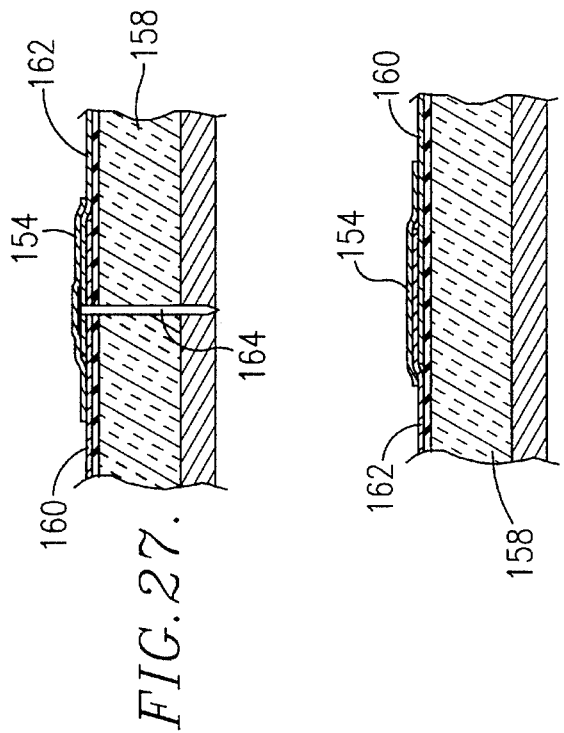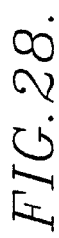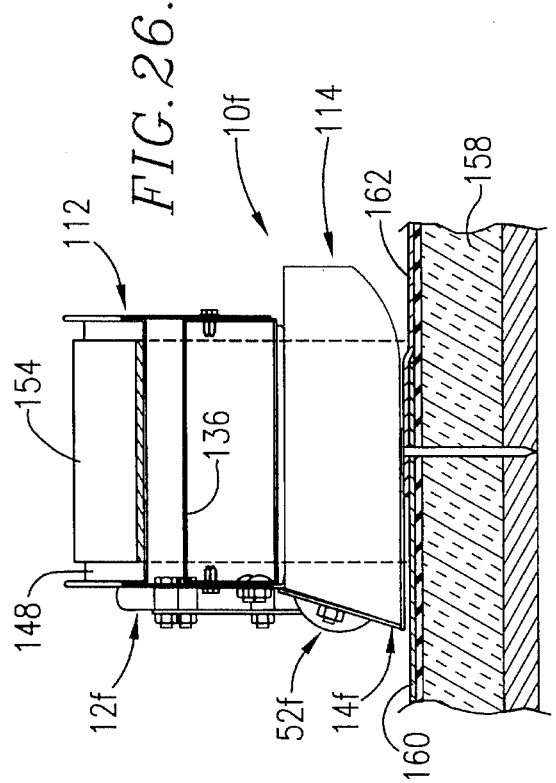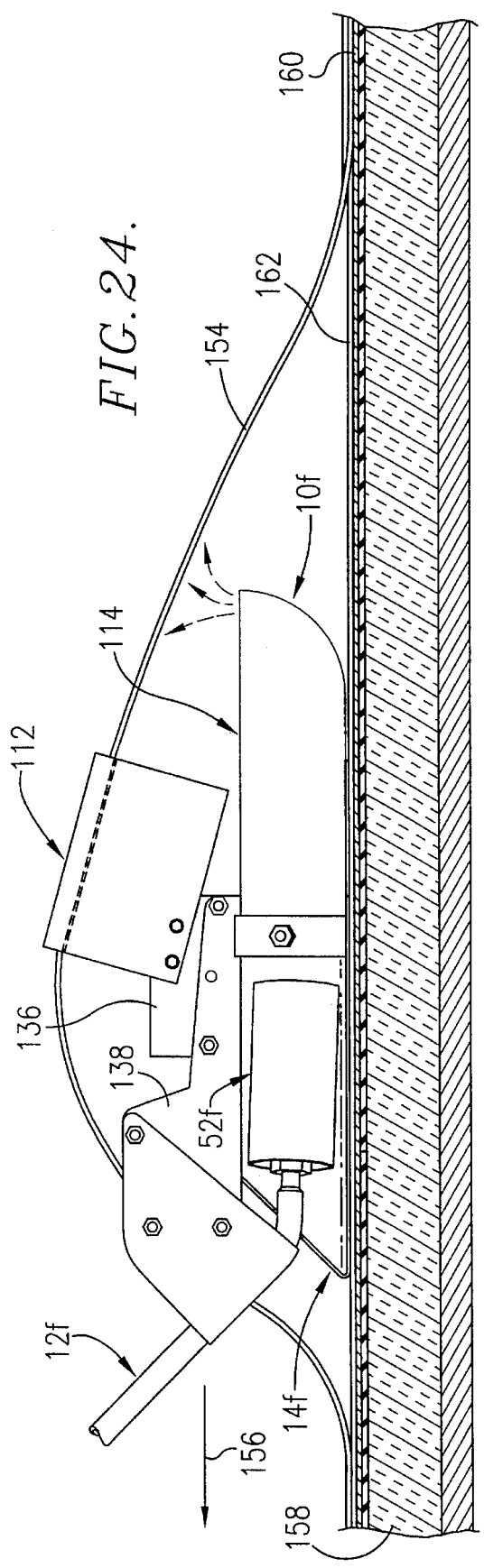

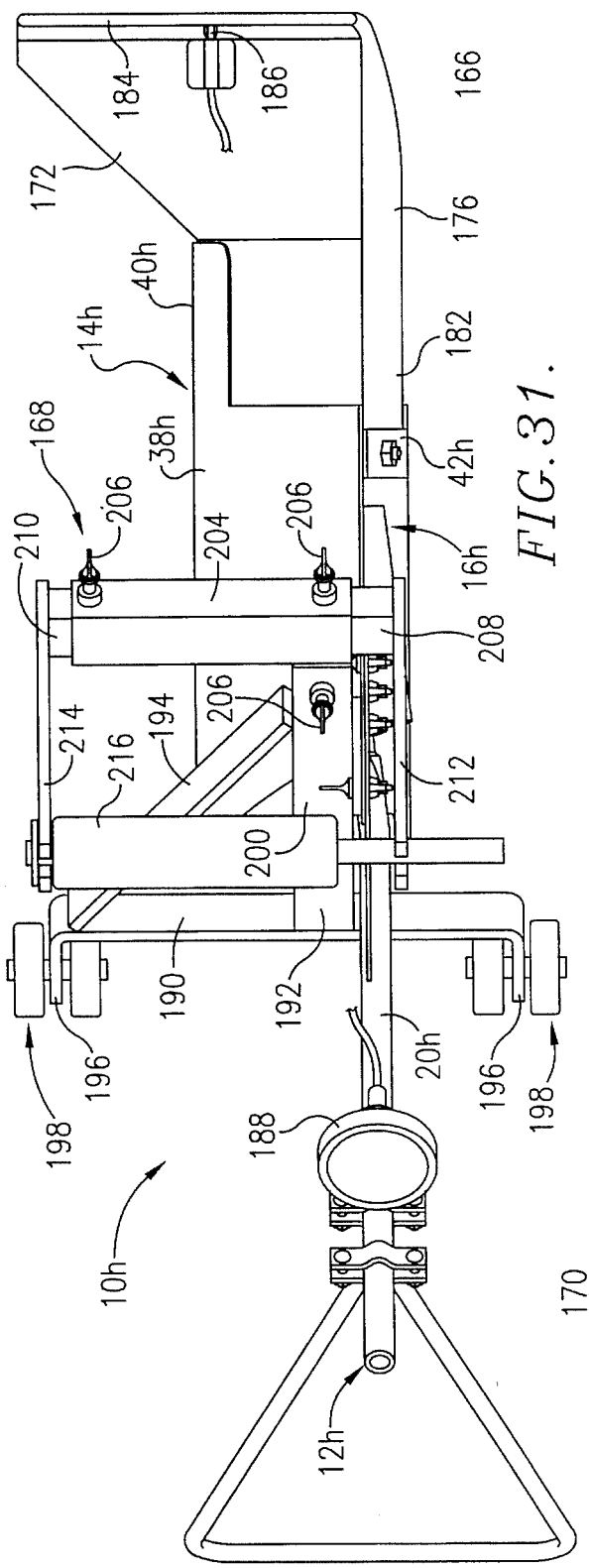
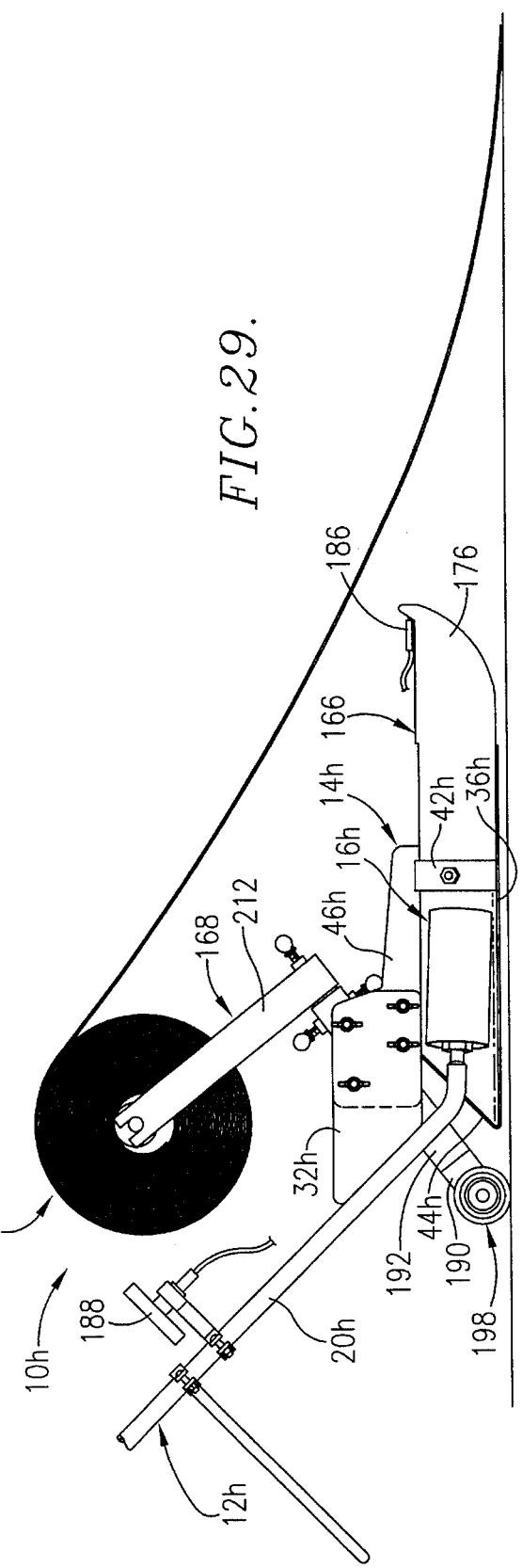

ROOFING TORCH

RELATED APPLICATION

The present application is a continuation-in-part of application Ser. No. 08/062,191, filed May 17, 1993, now U.S. Pat. No. 5,353,782, which is a continuation-in-part of application Ser. No. 07/880,235, filed May 8, 1992, now U.S. Pat. No. 5,211,158, issued May 18, 1993.

BACKGROUND OF THE INVENTION

1. Field of the Invention

The present invention is broadly concerned with an improved torch assembly of the type particularly useful in roofing applications where roofing membranes must be heated for the formation of lap joints between sections of roofing material. More particularly, it is concerned with such a torch assembly including an elongated handle having a drag shoe element coupled to the lower end thereof and receiving a strategically oriented torch; the shoe element further includes a rearwardly extending flame-directing barrier wall or diverter serving to properly direct the torch flame as the assembly is pulled along or over a lap joint.

2. Description of the Prior Art

Many commercial roof constructions include a metal substrate having a foam insulating layer thereon, with a rigid, weather-resistant roofing board applied over the foam layer. Finally, modified bitumen roofing membrane is secured to the roofing board, typically through the use of an asphalt-based roofing mastic. Installation of such a built-up roof involves first attaching prefabricated panels each made up of preformed foam and roofing board layers over the metal deck, followed by application of roofing mastic and finally the roofing membrane. The latter material is generally provided in rolls, and successive, overlapped strips thereof are applied to the prefabricated panels and adhered in placed by the roofing mastic. The lap joints between adjacent membrane strips are also adhesively secured by heating the lap joint regions, and the membranes are rolled to complete the roof.

During formation of the lap joints, it is common to employ a trowel or other implement in one hand to lift a lap section, and hand-held torch in the other hand for the purpose of heating the membrane in and around the lap area. Thereafter, the upper layer of the lap joint is laid over the heated membrane and the joint is rolled. Use of a conventional roof torch has proven to be somewhat troublesome and difficult. Specifically, elevating the lap section and playing a torch flame over the roofing membranes inevitably leads to uneven heating and consequent poor lap joint welding. Hence, the lack of suitable means for orienting the torch and maintaining its position as a lap joint is traversed is a major problem, and this increases the time spent in properly forming a lap joint. Moreover, the finished joints may be deficient and subject to failure due to wind lifting.

SUMMARY OF THE INVENTION

It is an object of the present invention to provide a torch assembly that may be used to repair an existing lap joint, or to protect the joints of an unfinished new roof during interruptions in construction. By providing an assembly that enables a strip of roofing material to be quickly and easily applied over and along an existing joint and sealed against the underlying membrane, it is possible to provide a sealed joint that will serve either as a repair to existing joints, or as temporary protection of a partially constructed new roof.

The problems in conventional roofing constructions outlined above are solved by a first embodiment of the present invention which provides a torch assembly for use in fabricating roof joints or the like wherein the torch head is properly oriented and maintained in position to effectively heat a lap joint area of roofing membrane. To this end, the assembly of the invention includes an elongated handle presenting an upper and lower end, with a shoe element operably coupled to the lower end of the handle and having upper and lower wall sections cooperatively defining laterally spaced apart side margins and a rearwardly opening, torch-receiving cavity. The shoe further includes an elongated flame-directing barrier wall extending rearwardly and along one of the side margins of the shoe. A torch is located within the cavity and is oriented for delivery of flame downwardly through the rearward open end of the shoe, and at an oblique angle relative to the longitudinal axis of the barrier wall.

In preferred constructions, the handle is in the form of an elongated gas delivery tube operably coupled to the torch, and a valve associated with the handle adjacent its upper end is selectively operable for controlling the flow of fuel to the torch. Moreover, the upper and lower wall sections of the shoe are advantageously joined along one side margin thereof, with the barrier wall comprising an extension of the interconnected upper and lower wall sections having a smaller width than the latter. The lower wall section is adapted to be moved along a lap joint area, and is accordingly flat. On the other hand, the upper wall section is designed to slide beneath the lap portion of an adjacent membrane strip, and therefore is preferably arcuate in cross-section.

In accordance with another construction of the first embodiment, a diverter member is adjustably positioned within the shoe adjacent the barrier wall for directing flame from the torch downwardly for direct, high intensity application of flame; this arrangement permits proper lap welding of materials heretofore difficult or impossible to properly weld, such as the commercially available "Apprematt" base material.

In a yet another construction, the shoe also carries an adjustable diverter, but in this instance the diverter and shoe are arranged for directing the torch flame upwardly through the upper wall of the shoe. This permits heating of a roofing material just prior to application thereof to roofing metal or other substrate.

In a second embodiment of the invention, a torch assembly for use in fabricating and repairing roof joints and the like includes an elongated handle presenting a forward upper end and a lower rearward end, a torch supported adjacent the lower end of the handle, and a supply means for supplying fuel to the torch. A support means is secured to the assembly for supporting a roll of bituminous material so that the material may be dispensed from the roll in a rearward direction as the apparatus is pulled forward. An elongated shoe is also secured to the assembly, and includes a front end adjacent the lower end of the handle and a rear end spaced rearward of the torch. The shoe includes upper and lower wall sections which are connected together at the rear end of the shoe, at least one side wall section which extends between the upper and lower wall sections and defines a flame-receiving cavity for substantially surrounding the flame directed by the torch, and a diverter means for diverting the flame in the flame-receiving cavity upward and rearward toward the bituminous material being dispensed from the support means.

By providing a torch assembly is accordance with the present invention, numerous advantages are realized. For example, by providing a means for supporting a roll of roofing material on the assembly, and guiding the material over a flame as it is dispensed, it is possible to quickly lay down a lap joint seal that covers the seam between a pair of underlying lengths of roofing material and protects against leakage. Such an advantage is beneficial not only in repairing existing roof laps which have pulled loose or otherwise failed, but also during new construction, where unprotected laps of an unfinished roof must be covered and sealed during extended breaks in construction.

Another advantage obtained by providing a torch assembly in accordance with the present invention resides in the ability of the assembly to accommodate roofing material rolls of varying width, and to adjust the spacing between the roll and the flame so that a desired amount of heating is achieved for any given type or size of material. Adjustment of the flame is also possible with the present invention, and further facilitates this purpose.

BRIEF DESCRIPTION OF THE DRAWINGS

Preferred constructions of the present invention are described in detail below with reference to the attached drawing figures, wherein:

FIG. 1 is a side elevational view of a torch assembly constructed in accordance with a first preferred embodiment of the invention;

FIG. 6 is a fragmentary, vertical sectional view illustrating the roofing torch of the invention as used during formation of a lap joint;

FIG. 7 is a fragmentary plan view illustrating the lap joint-forming operation depicted in FIG. 6;

FIG. 8 is a fragmentary vertical sectional view of the lap joint-forming operation shown in FIGS. 6 and 7;

FIG. 9 is a fragmentary vertical sectional view illustrating a completed lap joint;

FIG. 14 is a side view of another type of torch assembly in accordance with the first embodiment;

FIG. 15 is a plan view of the FIG. 14 embodiment;

FIG. 16 is a sectional view taken along the line 16—16 of FIG. 15;

FIG. 17 is a bottom view of the FIG. 14 embodiment;

FIG. 18 is a side view of the FIG. 14 embodiment, shown during use thereof in a roofing operation;

FIG. 19 is an end view further illustrating the operation of the FIG. 14 embodiment;

FIG. 20 is a side elevational view of a roofing torch assembly constructed in accordance with a second preferred embodiment of the invention;

FIG. 21 is a top plan view of the assembly of FIG. 20;

FIG. 22 is a rear elevational view of the FIG. 20 embodiment;

FIG. 23 is a side elevational view thereof, illustrating the side of the assembly opposite the side shown in FIG. 20;

FIG. 24 is a side elevational view thereof illustrating the torch and guide element during use;

FIG. 25 is a top plan view of the assembly during use;

FIG. 26 is a front elevational view thereof;

FIG. 27 is a sectional view taken along line 27—27 of FIG. 25, illustrating the completed roof;

FIG. 28 is a sectional view taken along line 28—28 of FIG. 25;

FIG. 29 is a fragmentary side elevational view of a torch assembly constructed in accordance with another embodiment of the present invention;

FIG. 31 is a top plan view of the assembly;

DETAILED DESCRIPTION OF THE PREFERRED EMBODIMENT

Figure 3:
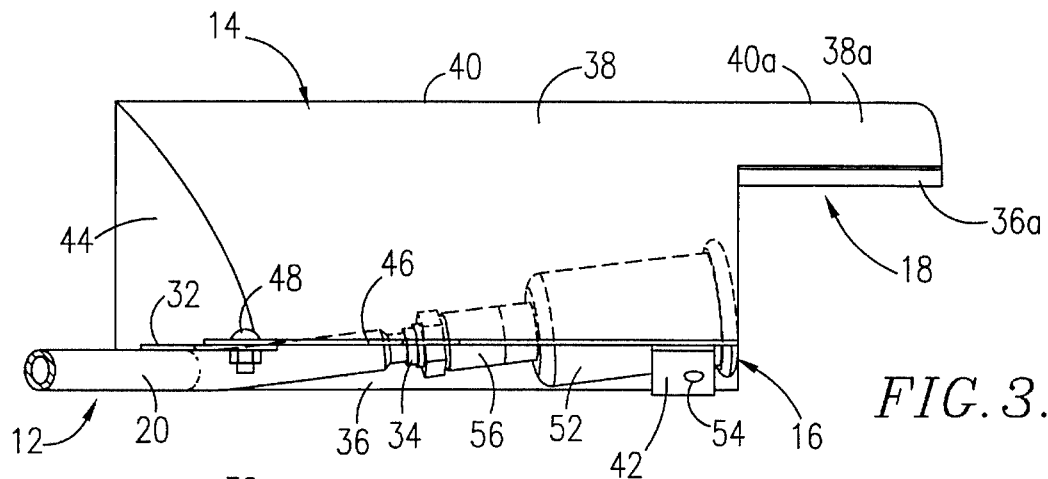
FIG. 3 is a fragmentary plan view of the lower end of the torch assembly, with certain parts being illustrated in phantom.

Turning now to the drawings, and particularly FIGS. 1–5, a roofing torch assembly 10 is illustrated. Broadly speaking, the assembly 10 includes an elongated handle 12 having a shoe element 14 secured the lower end thereof. The shoe element in turn houses a tubular torch 16 which is strategically oriented for proper application of flame to a lap joint, and has a rearwardly extending flame-directing barrier wall 18.

In more detail, the handle 12 is in the form of an elongated, tubular metallic body 20 adapted to convey torch fuel therethrough. The body 20 has, adjacent its upper end and in operative communication with the interior thereof, a selectively operable fuel valve 22. In addition, an external grip 24 is provided, which has a gas tube 26 therethrough which is operably coupled with the inlet of valve 22 and adapted for connection to a flexible gas line via a quick-disconnect coupling which enables the line to be immediately detached from the gas tube in the event of an emergency or the like. A loop-type auxiliary grip 28 is secured to body 20 in spaced relationship to grip 24. A metallic, generally triangular torch rest 30 is likewise affixed to the body 20, proximal to the lower end thereof.

The body 20, adjacent the lowermost end thereof where the tube is bent to a generally horizontal orientation, is equipped with an upstanding, integrally attached, apertured web 32. The terminal end of the body 20 moreover has a threaded fixture 34 therein.

The shoe element 14 is formed of metal and includes a lower, generally flat wall section 36 together with an arcuate in cross-section upper wall section 38. The wall sections 36, 38 are joined at an apex 40 in order to present a generally triangular in cross-section shoe configuration. As shown, the apex 40 defines one side margin of the shoe, whereas the opposite side margin thereof is presented by respective, vertically spaced apart ends of the wall sections. It will also be observed that an upright connector wall 42 is connected between the upper and lower wall sections 36, 38 at the rearward end of the shoe; and that an oblique forward wall 44 serves to close the opposite end of the shoe. The upper wall section 38 also has an upstanding, integral connection bracket 46 which is apertured and designed to mate with handle web 32. Bolts 48 are employed for interconnecting the shoe element 14 to the handle 12.

The barrier wall 18 is integral with shoe 14 and is in the form of rearwardly extending extensions 36a, 38a of the corresponding wall sections 36, 38. The extensions 36a, 38a are integrally joined along apex 40a, and have a width substantially less than the wall sections 36, 38.

It will therefore be seen that the overall shoe element 14 presents a rearwardly opening, torch-receiving cavity 50 between the wall sections 36, 38 and rearwardly of forward wall 44.

The torch 16 is in the form of an elongated, metallic, cup-like torch head 52 which is secured within the cavity 50 by means of a bolt 54 extending through connector wall 42 as shown. The open end of the head 52 is positioned at the open rearward end of the shoe element 14. The opposite end of the head 52 is provided with an apertured sleeve 56 which is secured to fitting 34 and has a tubular extension 58 extending into the confines of torch head 52.

Figure 2:
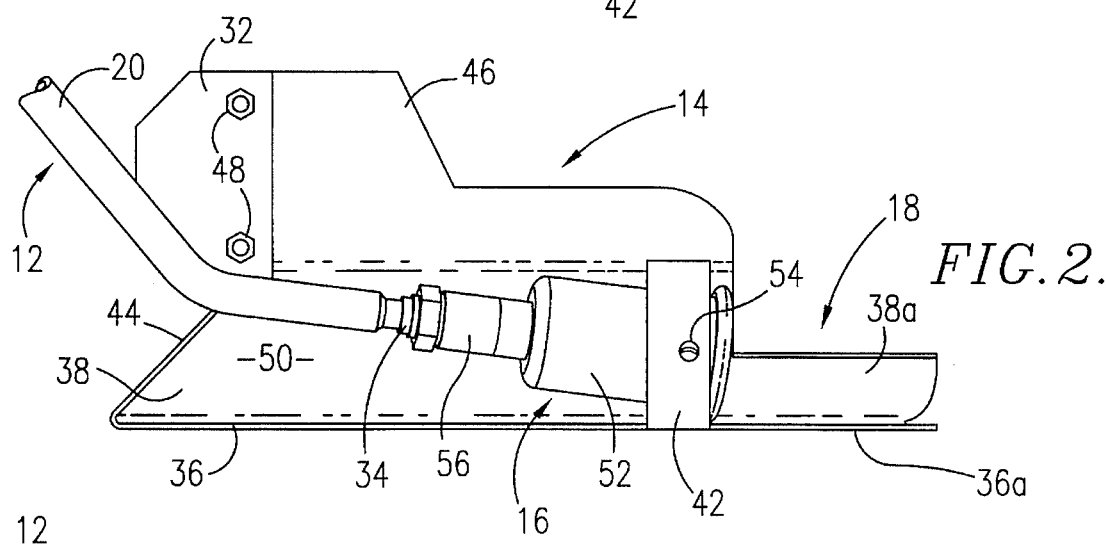
FIG. 2 is an enlarged, fragmentary view illustrating the lower end of the torch assembly, viewing the same from the side opposite that depicted in FIG. 1.
Figure 4:
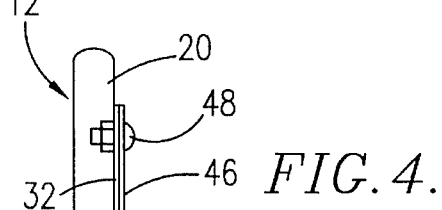
FIG. 4 is a fragmentary rear view of the lower end of the torch assembly, illustrating the orientation of the open end of the torch.
Figure 5:
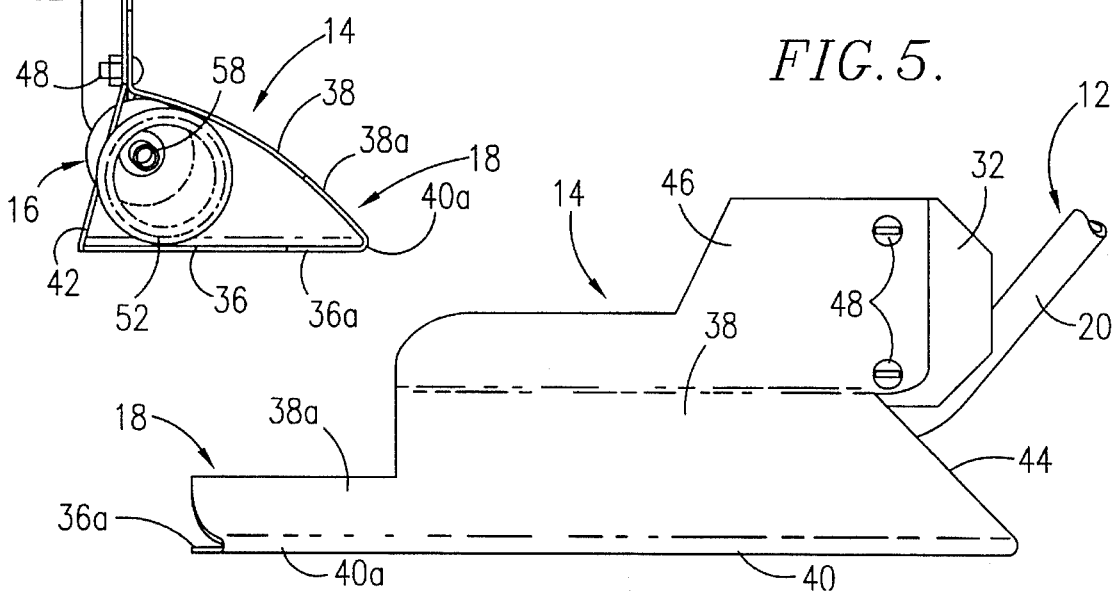
FIG. 5 is a side view similar to that of FIG. 2, but depicting the opposite side of the lower end of the torch assembly.
Figure 11:
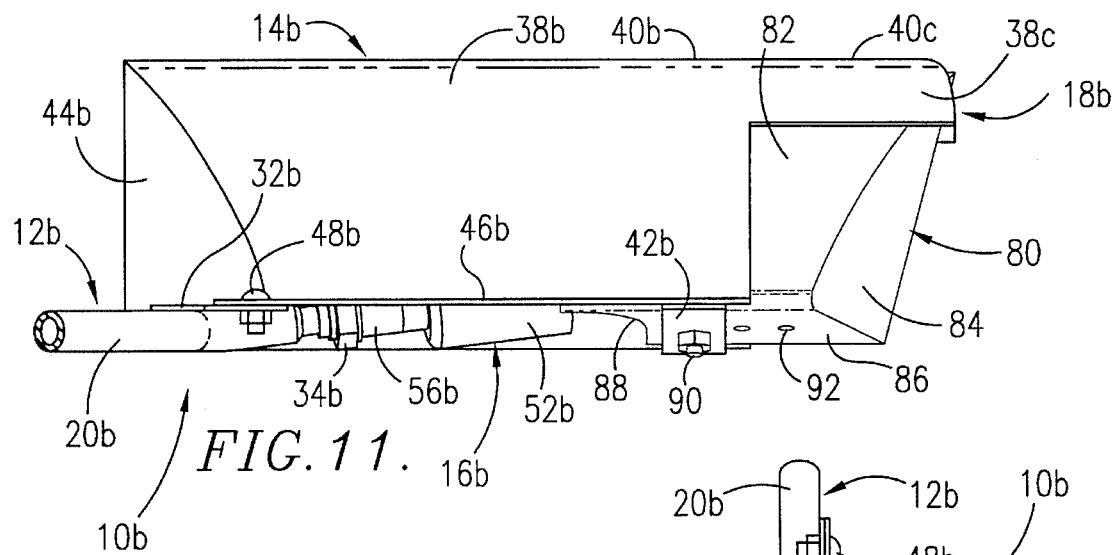
FIG. 11 is a plan view thereof.
Figure 12:
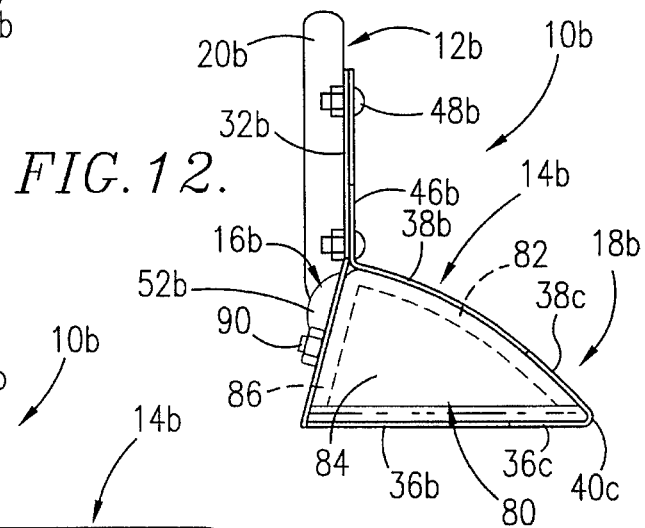
FIG. 12 is a an end view thereof.
Figure 10:
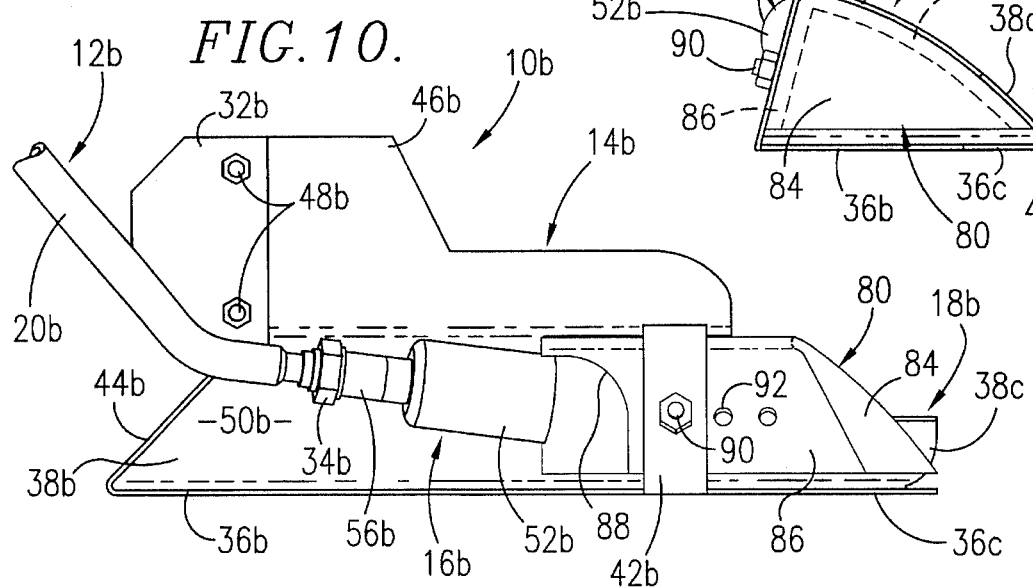
FIG. 10 is a side view of another torch assembly in accordance with the first preferred embodiment of the invention.
Figure 13:
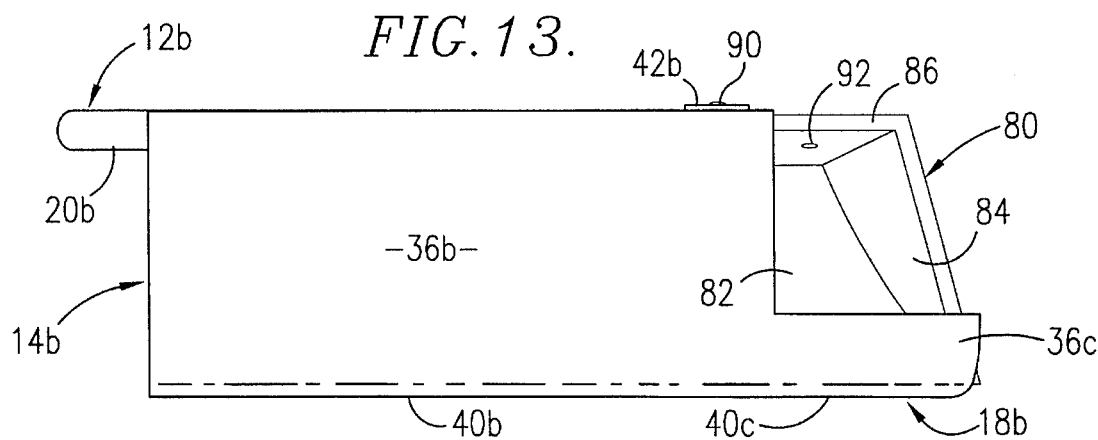
FIG. 13 is a bottom view thereof.

As best seen in FIGS. 2 and 3, the torch 16, and particularly head 52, is strategically located within cavity 50 for appropriate application of flame through the open rearward end of the shoe element 14. Specifically, it will be seen that the torch 16 is oriented for delivery of flame downwardly and also at an oblique (i.e., acute) angle relative to the longitudinal axis of barrier wall 18. This location of the torch 16 relative to the open rearward end of shoe element 14 and barrier wall 18 serves to properly direct flame from the open end of torch 52 along a roof joint.

Attention is next directed to FIGS. 6–8, which illustrate the assembly 10 in use during formation of a lap joint. Specifically, these views depict the formation of a built-up roof including a lowermost metallic deck 60, having a composite 62 applied thereover and secured in place by means of mastic 64. The composite 62 includes a layer of polyurethane foam insulation 66 as well as a "Perlite" uppermost roofing board 68. As shown, an additional layer 70 of roofing mastic is applied over the roofing board, and respective, side-by-side strips of roofing membrane 72, 74 are applied over the mastic layer 70. The ends of the membrane strips 72, 74 are located for overlapping as illustrated.

During lap joint formation, the torch assembly 10 is placed atop the lap joint area 76, with the overlapping end section of membrane 74 resting atop arcuate upper wall portion 38 of shoe element 14 (see FIG. 6). The torch is then fired, with gas being delivered through the tube 26 and handle 20 to the head 52; gas flow is controlled by appropriate manipulation of valve 22. As the torch is thus operated to create a flame of combustion products exiting head 52 and extending rearwardly from the shoe element 14, the entire assembly 10 is pulled forwardly in the direction of arrow 78 (FIG. 8). This serves to uniformly heat the lap joint area, with the barrier wall 18 properly guiding and deflecting the flame. As the lap joint area is thus heated, the overlapping marginal section of membrane 74 is applied to the heated membrane, and a roller or other similar device (not shown) is employed to press the membranes 74 and 72 together. This serves to complete the lap joint as best seen in FIG. 9.

FIGS. 10–13 illustrate another embodiment in accordance with the present invention. This embodiment is in many respects identical with that of FIGS. 1–9, and where identical structure or components are utilized in the two embodiments, the same reference numbers have been used with the addition of the letter "b" in connection with unlettered reference numerals used in the FIGS. 1–9 embodiment, and with the addition of the letter "c" in connection with lettered reference numerals used in the FIGS. 1–9 embodiment.

In particular, it will be observed that the second embodiment includes the identical handle 12b and shoe element 14b described previously. In this embodiment, however, the torch head 52b is supported in a cantilever fashion on the fixture 34b. A somewhat smaller torch head 52b is also preferably used.

Furthermore, the torch 10b of this embodiment is equipped with a rearmost flame diverter 80 positioned at least partially within the confines of shoe element 14b. The diverter 80 is in the form of a metallic body presenting an arcuate top wall 82, rear wall 84 and apertured sidewall 86 having arcuate forward edge 88. The forward end of diverter 80 is open and closely adjacent the outlet end of torch head 52b. The bottom of diverter 80 is open (see FIG. 13) and is positioned rearward of the trailing edge of generally planar bottom wall 36b and over the cutout defined by the wall 36b and extension 38b of the shoe element 14b.

The diverter 80 is maintained in position within shoe element 14b by means of bolt and nut assembly 90 passing through connector wall 42b and through one of the three adjustment apertures. 92 provided in sidewall 86. Thus, the diverter 80 may be selectively adjusted fore and aft in shoe element 14b, thereby exposing greater or lesser amounts of the open body of the diverter 80 for passage of flame therethrough.

The use of torch 10b is very similar to that of the first embodiment. The torch head 52b is lit, and flame and combustion products are directed rearwardly and thence downwardly through the open bottom of diverter 80. This creates an intense heating effect directly below the diverter for effective lap joint formation. Of course, during use the torch 10b is pulled along a pair of over-lapped sections of roofing material, in order to establish a welded joint therebetween.

FIGS. 14–19 illustrate the construction and use of a third torch embodiment 10d in accordance with the invention. This embodiment is very similar to that shown in FIGS. 11–13, and again where identical structure or components are utilized in the two embodiments, the same reference numbers have been used with the addition of the letter "d" in connection with letter "b" reference numerals from the FIG. 10–13 embodiment, and with the addition of the letter "e" in connection with the letter "c" reference numerals from the FIG. 10–13 embodiment.

Specifically, the third embodiment includes the identical handle 12d, with a modified shoe element 14d. As illustrated, the torch head 52d is supported in a cantilever fashion on fixture 34d. As best seen in FIG. 15, the shoe element 14d includes a lower, generally flat wall section 36d together with an arcuate in cross section upper wall section 38d and an oblique forward wall 44d. The walls 36d, 38d are joined at apex 40d. An upright connector wall 42d extends between the walls 36d and 38d as best seen in FIG. 14. Rearwardly extension walls 36e, 38e are also provided, which are joined along apex 40e.

The torch 10d is equipped with rearmost flame diverter 94 positioned at least partially within the confines of shoe element 14d. The diverter 94 is in the form of a metallic body presenting an arcuate top wall 96, bottom wall 98, side wall 99 and upright end wall 100. The forward end of diverter 94 is open and is adjacent the outlet end of torch head 52d. A flame exit opening 102 is provided between top wall 96 and the upper extent of end wall 100, it will be observed that the opening 102 is positioned rearwardly of shoe top wall 38d. Additionally, a top wall extension 104 is secured to and extends rearwardly from the upper margin of end wall 100 in order to provide sliding support for a roofing material during use of the torch 10d. As best shown in FIG. 17, the bottom of diverter 94 is closed to prevent passage of flame downwardly.

The diverter 94 is maintained in position within shoe element 14d by means of bolt and nut assembly 106 passing through connector wall. 42b and an appropriately located aperture in sidewall 99.

The use of torch 10d is illustrated in FIGS. 18–19. As can be appreciated, the presence of diverter 94 serves to direct flame and combustion products upwardly through opening 102. This creates an intense heating effect directly above the diverter. As shown in FIGS. 18–19, the torch 10d is particularly useful for the application of base roofing material 108 directly to a metal deck 110 or other similar substrate. In particular, the torch is lit and shoe 14d is placed under the margin of material 108, and specifically with such margin lying on shoe wall 38d and extension wall 104. This ensures that flame and combustion products are directed upwardly directly against the margin material 108 for rapid heating thereof. The torch 10d is pulled in the direction of arrow 78 of FIG. 18 so as to successively heat sections of the material margin. As the torch is so moved, the heated material 108 is then attached by pressure roller or similar means to the underlying deck 110.

FIGS. 20–28 depict a torch assembly for use in fabricating and repairing roof joints, and differs from the previously described embodiments in that the assembly, rather than being configured for sliding along and between the sheets of a lap joint, is constructed to lay down an additional strip of roofing material over an existing joint to seal the joint against leakage. Where structure or components are utilized in the assembly which correspond to components described with reference to the first embodiment above, the same reference numbers have been used with the addition of the letter "f". Otherwise, new numerals are used to designate new structure specific to this embodiment.

Specifically, as can be seen in FIG. 20, the torch assembly includes a handle 12f, a shoe element 14f, and guide structure 112. The handle 12f communicates fuel to the torch head 52f, which is positioned to emit flame at a rearward angle as shown in FIG. 21. The shoe element 14f includes a diverter 114, which mounts upon a connector wall 42f by means of a bolt and nut assembly 116 passing through an apertured sidewall 118. As illustrated in FIGS. 22 and 23, a bottom wall 36f of the shoe element meets with an arcuate upper wall 38f to form an apex 40f, and the front end 120 of the diverter is received therein. As shown in FIG. 23, the diverter 114 includes a vertical sidewall 122, which diverges outwardly in a rearward direction extending from a forward end 124 to rearward end 126 (shown in FIG. 21). A second sidewall 128 extends rearwardly from the rearward end 126 over a distance approximately equal to the rearwardly extending dimension of a flame exit opening 130 in the shoe. The rearward end 126 rises arcuately from a bottom wall 132 shown in FIG. 22, toward the upper wall 134 to define the rearmost margin of the opening 130. The diverter 114 is positioned to receive flame from the torch head 52f, and serves to direct this flame upwardly along the surface 134 for exiting through the opening 130.

As shown in FIG. 23, the guide structure 112 includes a square channel 136 bolted between a bracket 138 and an upper guide element 140. The lower channel 136 is supported by an angular brace member 142 connecting the upper wall 38f and the rearward end of the channel 136.

As illustrated in FIG. 22, the channel 136 is a hollow rectangular body having apertured sidewalls 144 and 146 through which sheet metal screws connect the channel 136 to the guide element 140.

The guide element 140 is formed from a single piece of sheet metal having apertured sidewalls which rise to respective 180° bends forming upper edges of the element. A channel 148 extends between the edges and is sized to receive and guide a strip of roofing material over the shoe and the exit opening 130 so that the material is heated before being laid against the underlying materials. As shown in FIGS. 20 and 23, the channel 148 is sloped from a forward edge 150 to a rearward edge 152.

The torch assembly illustrated in FIGS. 20–23 may be used either to repair a failed joint of an existing roof, or to provide a seal for lap joints of an uncompleted roof during extended layoffs or in inclement weather. Use of the torch assembly is similar in either of these environments, and is described with reference to FIGS. 24–28.

Turning first to FIG. 24, the assembly is positioned on a joint to be sealed, and a strip 154 of roofing material, preferably the same bituminous material as used in the materials of the underlying joint, is placed over the assembly in line with the joint. The guide element 140 supports and guides the strip within the channel 148, the strip having a width preferably ranging between about 3–8 inches, and preferably between 5–7 inches. The bitumen material of the strip 154 is characterized by the property of becoming tacky upon the application of heat for subsequent application to the underlying roofing material. As shown in FIG. 25, the diverter 114 is at least as wide as the strip 154 so that as the assembly is pulled along the joint in the direction of the arrow 156, the assembly lifts the strip over the shoe 14f and directs a flame toward the lower surface of the strip that is to contact the joint. Thereafter, the strip is guided down onto the roof and may be rolled to press the strip against the lap joint to seal the strip in place.

A partially completed new roof, such as one incorporating the commercially available "Apprematt" base material, is shown in FIG. 25, and includes two sections of foam insulation 158 which are placed side-by-side upon a wood or metal roof deck and covered by base sheets 160 of roofing material such as the Apprematt material. The base material sheets, typically available in 36 inch widths, are smaller than the underlying insulation, leaving a gap on either side of the joint in the insulation. This gap is sealed by the application of a cover sheet 162 which includes opposed marginal zones that overlap the base sheets 160. A plurality of screws or nails 164 are driven through the sheets 160, 162 at intervals along the joint. The strip 154 is then applied over and along the joint as described above, and seals the joint, as shown in FIG. 28, as well as the points at which the screws are driven into the roof, as illustrated in FIG. 27. This layered construction provides a ready base for subsequent further application of weather-resistant roofing materials.

The seal resulting from the use of a torch assembly of the present embodiment of the invention protects the seams along rolls of partially installed roofing material as necessitated by oncoming inclement weather or nighttime cessation of roofing operations. The strips are relatively quick and easy to install, and serve to prevent substantial leakage that might otherwise occur. Such water leakage could otherwise damage the interior of the building, and interfere with subsequent roofing operations.

Another construction of a roofing torch in accordance with the present invention is illustrated in FIGS. 29-33, and is similar to the embodiment of FIGS. 20-26 in that the torch assembly is used to apply a strip of roofing material to the lap joint of an underlying structure in order to either repair a failed existing joint or seal an unfinished joint of a roof under construction. Where structure or components are utilized in the assembly which correspond to components described with reference to the first embodiment above, the same reference numbers have been used with the addition of the letter "h". Otherwise, new numerals are used to designate new structure specific to this embodiment.

The assembly 10h is shown in FIG. 31, and generally includes an elongated handle 12h, a torch 16h, an elongated shoe element 14h, a diverter 166, and a support assembly 168 for supporting a roll 170 of APP, SPS, or another bituminous material on the assembly so that the material may be dispensed from the roll in a rearward direction as the apparatus is pulled forward.

The handle 12h presents a forward upper end and a lower rearward end, and is provided with a body 20h on which a grip and a generally triangular torch rest are affixed, as shown in the embodiment of FIG. 1. Thus, the handle presents a gripping means for permitting the apparatus to be gripped and pulled in a forward direction during use. Also, as with the previously described embodiments, the handle body 20h is hollow to define a flow path along which fuel is supplied under pressure to the torch from a suitable source, such as a back pack carried by the operator.

Figure 30:
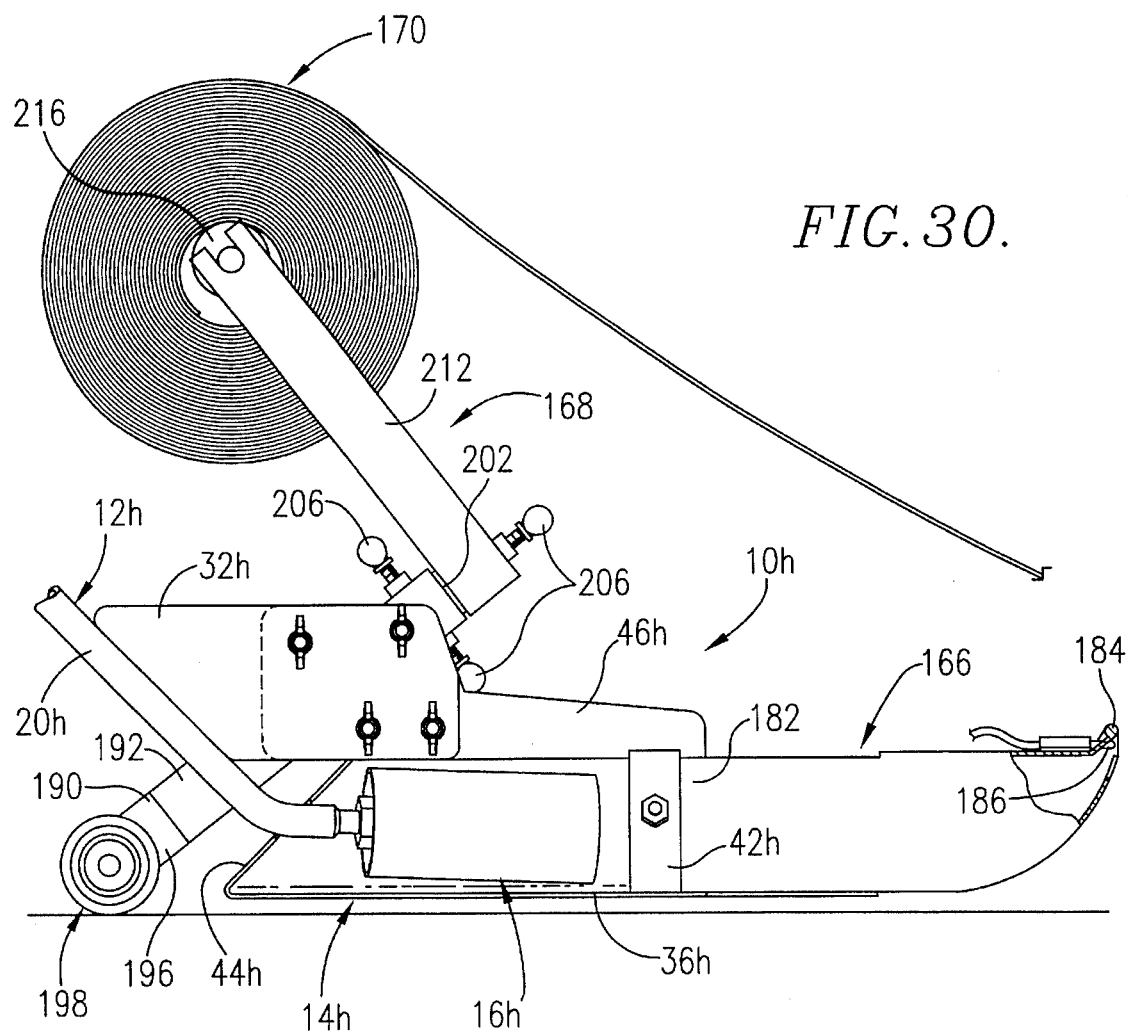
FIG. 30 is an enlarged fragmentary view thereof, partially broken away to illustrate various aspects of a shoe of the assembly.

As shown in FIG. 30, the torch 16h is supported on the lower end of the handle and is directed away from the handle. The torch ignites the fuel and directs the resulting flame away from the handle.

Figure 33:
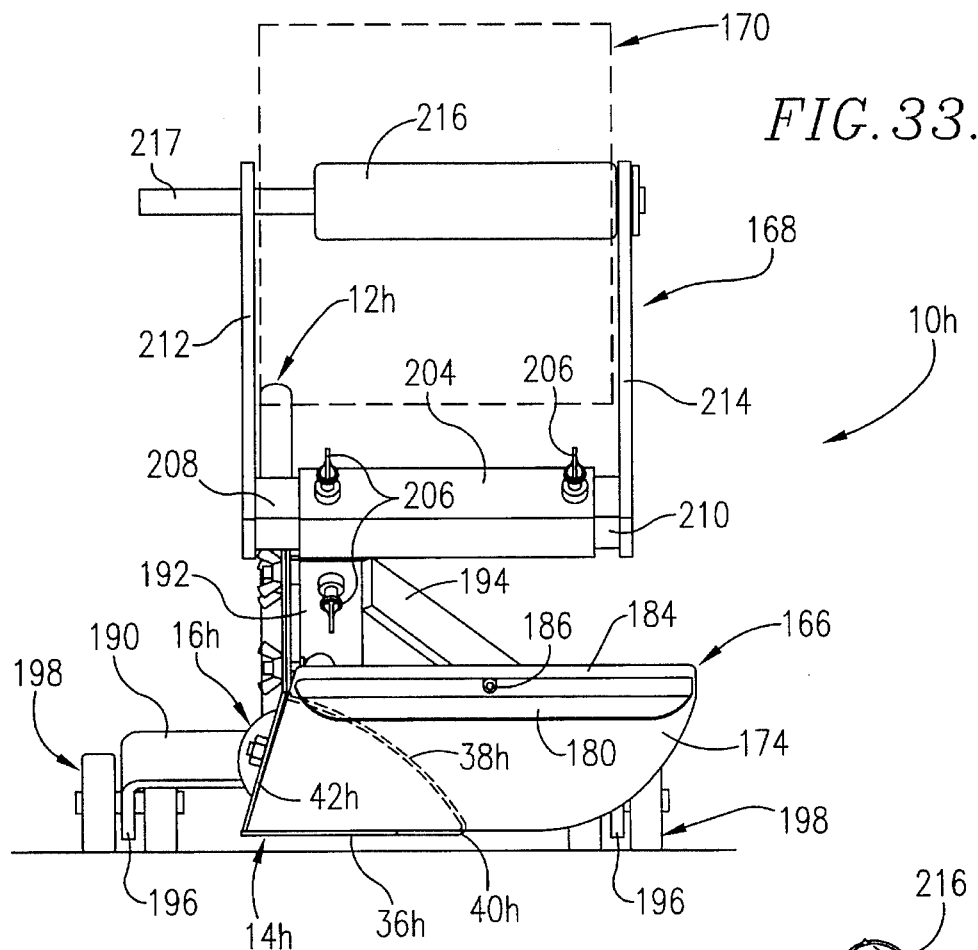
FIG. 33 is a front elevational view of the assembly.

An apertured web 32h is affixed to the handle body 20h adjacent the lower end, and supports the shoe element 14h. Turning to FIG. 33, the shoe element 14h is formed of metal and includes a lower, generally flat wall section 36h together with an arcuate in cross-section upper wall section 38h. The wall sections 36h, 38h are joined at an apex 40h in order to present a generally triangular in cross-section shoe configuration. The apex 40 defines one side margin of the shoe, whereas the opposite side margin thereof is presented by respective, vertically spaced apart ends of the wall sections 36h, 38h. As shown in FIG. 30, an upright connector wall 42h is connected between the upper and lower wall sections 36h, 38h at the rearward end of the shoe, and an oblique forward wall 44h serves to close the opposite end of the shoe. The upper wall section 38h also has an upstanding, integral connection bracket 46h which is apertured and designed to mate with the handle web 32.

Figure 34:
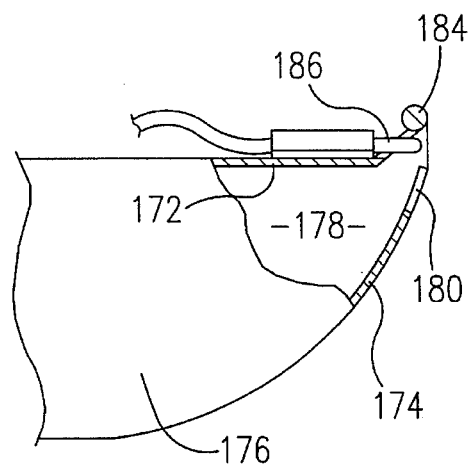
FIG. 34 is a fragmentary side-elevational view of the rear end of the assembly, illustrating the details of a rearmost flame exit opening.

The flame diverter 166 is supported on the shoe element 14h, and includes a body presenting an upper wall section 172, shown in FIG. 31, and a lower wall section 174, shown in FIG. 33. The upper and lower wall sections converge toward one another at the rear end of the diverter, as shown in FIG. 34, to define an end wall in the diverter. The diverter also includes a pair of laterally spaced side wall sections 176, 178, shown in FIGS. 30 and 32 respectively. The side wall sections extend vertically between the upper and lower wall sections. The upper, lower and side wall sections 172, 174, 176, 178 together define a flame-receiving cavity for substantially surrounding the flame directed by the torch so that the entire flame is directed into the cavity for use by the assembly in heating the strip of roofing material being applied to a joint.

The diverter 166 also includes a flame directing opening 180 for diverting the flame in the flame-receiving cavity upward and rearward toward the bituminous material being dispensed from the roll 170. As shown in FIG. 33, the opening is formed exclusively in the lower wall section 174 adjacent the upper wall section 172 so that an upper edge of the opening is defined by the upper wall section and a lower edge by the lower section.

Turning to FIG. 34, because the lower wall section is inclined toward the upper section at the rear end of the diverter, the flame within the cavity is directed both upward and rearward through the opening 180 and does not escape elsewhere from the cavity of the diverter. However, the heat from the flame does provide radiant heat to the lower wall section 174 so that as the assembly is moved along a joint, the lower section contacts the underlying material and heats it, facilitating adherence of the strip to the lower material.

As shown in FIG. 31, the side wall section 178 is angled outward and rearward from the shoe so that the width of the diverter, and the opening 180, is as wide as any strip to be employed with the assembly. The forward end of diverter 182 is open and is held closely adjacent the outlet end of the torch 16h. The diverter is maintained in position within the shoe element 14h by means of a bolt and nut assembly passing through the connector section 42h and the side wall 176.

The rear end of the upper wall section 172 is shown in FIG. 34, and includes a raised lip 184 that extends over the opening to define the upper edge thereof. A temperature sensor is provided on the diverter, and includes a probe 186 that extends into the opening 180. The probe is connected to an indicator 188 shown in FIG. 31, which is supported on the handle in order to provide the operator with an indication of the temperature of the hot gasses and flame exiting the cavity. The assembly also includes a control means for controlling the amount of fuel supplied to the torch so that the proper amount of heat may be used with each particular type of roofing material employed with the assembly.

The support assembly 168 is illustrated in FIG. 33, and includes a generally triangular frame defined by a lower U-shaped piece 190, an upstanding tubular member 192, and an angled piece 194 connecting the lower piece 190 with the upper end of the tubular member 192. The lower piece 190 includes a pair of depending legs 196 in which apertures are formed to receive wheel assemblies 198. In this manner, additional support is provided for both the assembly and the roll of roofing material carried on the support assembly.

Figure 32:
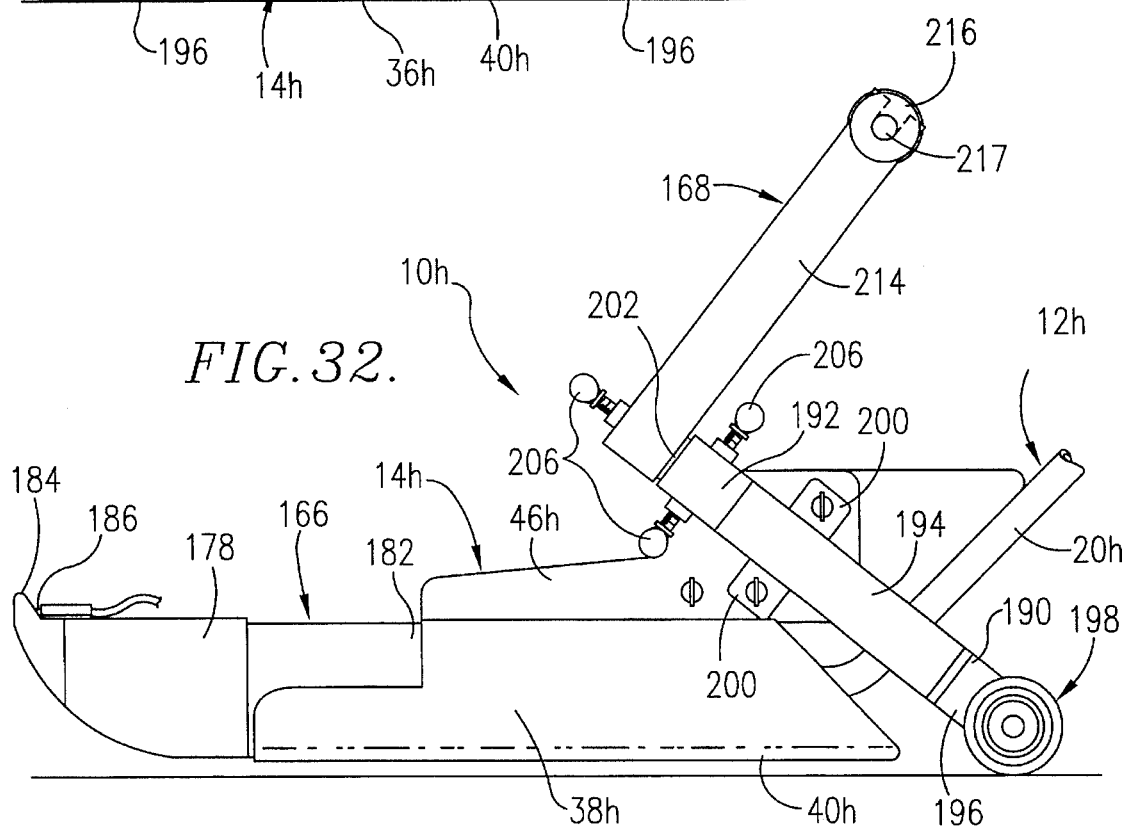
FIG. 32 is a side elevational view of the assembly, illustrating the opposite side of the shoe than that shown in FIG. 30.

As shown in FIG. 32, the upstanding tubular member 192 is provided with lugs 200 by which the member is secured to the web 32h, and the upper end of the member is open to receive a depending leg 202 of a transverse support bar 204. Suitable fasteners 206 are used to secure the leg 202 in place on the upright frame member, and the leg is elongated so that the height of the bar 204 may be adjusted relative to the upstanding member 192 before being secured in place. In this manner, a means is provided for adjusting the position of the bar 204 relative to the diverter opening 180 in order to adjust the height of the bituminous material being dispensed from the support means over the flame.

Turning to FIG. 31, the support bar 204 is a hollow tubular member having opposed open axial ends adapted to receive the feet 208, 210 of a pair of laterally spaced apart arms 212, 214 for adjustable movement toward and away from one another. The arms in turn provide a cradle for supporting a spool 216 on which the roll 170 may be retained. The arms 212,214 are adjustable on the bar 204 to vary the distance between them so that the material of the roll is guided by the arms when dispensed from the roll. Once adjusted, the arms are secured in place by additional fasteners 206. An extension 217 extends from the spool for accommodating this adjustment. Thus, the roll material is held in alignment with the joint in the underlying roof simply by pulling the assembly along and over the joint during use.

Operation of the assembly is similar to use of the assembly shown in FIGS. 20–26 in that the assembly is used to apply a strip of roofing material onto an existing or partially constructed roof to seal a lap joint in the roof. However, in the present embodiment, it is not necessary to lay the strip of material down along the joint before it is heated. Instead, the material is supported directly on the assembly so that it is dispensed and heated simultaneously. Thus, it is only necessary to follow application of the strip with a rolling operation to complete the assembly.

By utilizing a torch assembly in accordance with the present embodiment, numerous advantages are achieved. For example, because the strip is dispensed and heated at the same time, it is only necessary to align the material with the underlying joint once during application. The strip is not free to blow away from the desired position, but rather is retained on the roll until heated and applied to the roof.

In addition, the assembly can be constructed either as shown, or as a mirror image of the embodiment shown, so that right-hand and left-hand versions are available. Thus, an operator will always be able to face the edge of the roof for safety. Control of the torch is also improved, enabling the operator to monitor the temperature of the gasses and flame being directed toward the strip of material being dispensed. The operator may also adjust the position of the spool relative to the flame so that the desired heating temperature may be achieved.

Yet another advantage provided resides in the use of the upper lip which protects the opening from the strip material so that the material is prevented from falling into the cavity of the diverter during use. This feature of the assembly keeps the diverter clean.

Although the present invention has been described with reference to the preferred embodiment illustrated in the attached drawing figures, it is noted that substitutions may be made and equivalents employed herein without departing from the scope of the invention as recited in the claims.

I claim:

1. A torch assembly for use in fabricating and repairing roof joints and the like, comprising:

an elongated handle presenting a forward upper end and a lower rearward end, the upper end presenting a gripping means for permitting the apparatus to be gripped and pulled in a forward direction during use;

a torch supported adjacent the lower end of the handle for directing a flame away from the handle;

a supply means for supplying fuel to the torch;

a support means for supporting a roll of bituminous material on the apparatus so that the material may be dispensed from the roll in a rearward direction as the apparatus is pulled forward; and an elongated shoe having a front end adjacent the lower end of the handle and a rear end spaced rearward of the torch, the shoe including upper and lower wall sections which are connected together at the rear end of the shoe, at least one side wall section which extends between the upper and lower wall sections and defines a flame-receiving cavity for substantially surrounding the flame directed by the torch, and a diverter means for diverting the flame in the flame-receiving cavity upward and rearward toward the bituminous material being dispensed from the support means.

2. A torch assembly as recited in claim 1, wherein the support means includes a transverse spool, a pair of laterally spaced arms connected between the spool and the handle, and a first adjustment means for adjusting the lateral spacing between the arms to permit rolls of varying widths to be retained on the spool between the arms.

3. A torch assembly as recited in claim 2, wherein the first adjustment means includes a transverse support bar on which the arms are received for adjustable movement toward and away from one another.

4. A torch assembly as recited in claim 3, wherein the support means includes a second adjustment means for adjusting the position of the support arm relative to the diverter means in order to adjust the height of the bituminous material being dispensed from the support means over the flame.

5. A torch assembly as recited in claim 1, further comprising a pair of ground engaging wheels connected to the handle forward of the torch.

6. A torch assembly as recited in claim 1, wherein the handle is hollow and the supply means supplies fuel to the torch through the handle.

7. A torch assembly as recited in claim 1, wherein the diverting means includes a transverse slot formed in the shoe at the rear end beneath the upper wall.

8. A torch assembly as recited in claim 1, wherein the lower wall section slopes upward toward the upper wall section at the rear end of the shoe, and includes a transverse slot through which the flame is directed upward and rearward toward the bituminous material being dispensed from the support means.

9. A torch assembly as recited in claim 8, wherein the upper wall section includes a raised lip that defines an upper edge of the slot, and the lower wall section defines a lower edge of the slot, the lower edge being disposed forward of the upper edge relative to the shoe.

10. A torch assembly as recited in claim 1, further comprising control means for controlling the amount of fuel supplied to the torch, and a temperature measuring means for measuring the temperature of the flame as it is diverted from the flame-receiving cavity.

* * * * *